United States Patent
Akopian et al.

(10) Patent No.: US 7,876,738 B2
(45) Date of Patent: Jan. 25, 2011

(54) PREVENTING AN INCORRECT SYNCHRONIZATION BETWEEN A RECEIVED CODE-MODULATED SIGNAL AND A REPLICA CODE

(75) Inventors: David Akopian, Tampere (FI); Harri Valio, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 1044 days.

(21) Appl. No.: 10/792,676

(22) Filed: Mar. 2, 2004

(65) Prior Publication Data

US 2005/0195789 A1 Sep. 8, 2005

(51) Int. Cl.
H04B 7/216 (2006.01)
(52) U.S. Cl. ............... 370/342; 370/320; 370/324; 370/350; 455/418; 455/422.1; 455/456.1; 455/456.2; 455/456.3; 455/502; 375/143; 375/150; 375/340
(58) Field of Classification Search ............... 370/320, 370/324, 342, 350; 455/418, 422.1, 456.1, 455/456.2, 456.3, 502; 375/142, 143, 150, 375/340
See application file for complete search history.

(56) References Cited

U.S. PATENT DOCUMENTS

| | | | | |
|---|---|---|---|---|
| 5,132,986 A | * | 7/1992 | Endo et al. ............... | 375/142 |
| 5,185,610 A | * | 2/1993 | Ward et al. ............. | 342/357.11 |
| 5,334,468 A | * | 8/1994 | Yamasita et al. .............. | 430/7 |
| 5,414,729 A | * | 5/1995 | Fenton ...................... | 375/149 |
| 5,535,278 A | * | 7/1996 | Cahn et al. ................... | 380/274 |
| 5,541,606 A | * | 7/1996 | Lennen ................... | 342/357.12 |
| 5,808,582 A | * | 9/1998 | Woo ...................... | 342/357.12 |
| 5,896,304 A | * | 4/1999 | Tiemann et al. ............... | 708/5 |
| 5,943,363 A | * | 8/1999 | Hanson et al. ............... | 375/150 |
| 5,982,811 A | * | 11/1999 | Harrison et al. ............. | 375/150 |
| 6,005,899 A | * | 12/1999 | Khayrallah ................. | 375/343 |
| 6,038,250 A | * | 3/2000 | Shou et al. .................. | 375/143 |
| 6,208,291 B1 | * | 3/2001 | Krasner .................. | 342/357.12 |
| 6,249,542 B1 | * | 6/2001 | Kohli et al. ................. | 375/150 |
| 6,285,316 B1 | * | 9/2001 | Nir et al. ............... | 342/357.09 |
| 6,292,748 B1 | * | 9/2001 | Harrison .................... | 701/213 |
| 6,366,938 B1 | * | 4/2002 | Levison et al. .............. | 708/422 |
| 6,385,232 B1 | * | 5/2002 | Terashima ................... | 375/149 |
| 6,459,407 B1 | * | 10/2002 | Akopian et al. ......... | 342/357.12 |
| 6,584,142 B1 | * | 6/2003 | Chen et al. .................. | 375/143 |
| 6,606,346 B2 | * | 8/2003 | Abraham et al. ............ | 375/142 |
| 6,658,048 B1 | * | 12/2003 | Valio .......................... | 375/150 |
| 6,888,497 B2 | * | 5/2005 | King et al. ............. | 342/357.12 |
| 6,931,056 B2 | * | 8/2005 | Goodings ................... | 375/150 |
| 7,006,556 B2 | * | 2/2006 | Abraham et al. ............ | 375/142 |
| 7,142,589 B2 | * | 11/2006 | Valio .......................... | 375/150 |
| 7,277,476 B2 | * | 10/2007 | Akopian ..................... | 375/150 |
| 2002/0015456 A1 | * | 2/2002 | Norman et al. ............. | 375/340 |
| 2004/0176099 A1 | * | 9/2004 | Sahai et al. ............... | 455/456.1 |

* cited by examiner

Primary Examiner—Stephen M D'Agosta

(57) ABSTRACT

In order to prevent an incorrect synchronization between a received code-modulated signal and an available replica code, partial correlations are performed between a respective subset of samples of the replica code and samples of the received code-modulated signal associated to the respective subset of samples of the replica code at a specific alignment between the received code-modulated signal and the replica code. The results of the partial correlations are then compared to each other, and it may be decided based on this comparison whether the replica code corresponds to a code employed for code-modulating the received code-modulated signal.

27 Claims, 4 Drawing Sheets

PREVENTING AN INCORRECT SYNCHRONIZATION BETWEEN A RECEIVED CODE-MODULATED SIGNAL AND A REPLICA CODE

FIELD OF THE INVENTION

The invention relates to a method of preventing an incorrect synchronization between a code-modulated signal received by a receiver and an available replica code. The invention relates equally to a corresponding electronic device, to a corresponding module, to a corresponding system and to a corresponding software program product.

BACKGROUND OF THE INVENTION

A synchronization between a received code-modulated signal and an available replica code has to be achieved, for example, at a ranging receiver evaluating the time-of-arrival of received code-modulated signals.

A well known ranging receiver evaluating the time-of-arrival of received code-modulated signals is a receiver for the Global Positioning System (GPS).

GPS comprises more than twenty satellites as beacons that orbit the earth. The distribution of these satellites ensures that usually between five and eight satellites are visible from any point on the earth. Each of the satellites, which are also called space vehicles (SV), transmits two microwave carrier signals. One of these carrier signals L1 is employed for carrying a navigation message and code signals of a standard positioning service (SPS). The L1 carrier signal is modulated by each satellite with a different pseudo-random C/A (Coarse Acquisition) Code. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with navigation information at a bit rate of 50 bit/s. The navigation information comprises in particular orbit parameters, including ephemeris parameters which describe short sections of the orbit of the respective satellite. Further, a time-of-week TOW count is reported every six seconds as another part of the navigation message.

A GPS receiver of which the position is to be determined receives the signals transmitted by the currently available satellites, and a tracking unit of the receiver detects and tracks the channels used by different satellites based on the different comprised C/A codes. In order to be able to detect the channels used by different satellites, the receiver has access to a replica of the C/A codes employed by each of the satellites. The receiver is thus able to synchronize the available C/A codes with the C/A codes in the received signals in a correlation procedure.

By evaluating measurements on the tracked signals, the receiver first determines the time of transmission of the C/A code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits.

Based on the determined time of transmission of the C/A code and the measured time of arrival TOA of the C/A code at the receiver, the time of flight TOF required by the C/A code to propagate from the satellite to the receiver is determined. By multiplying this TOF with the speed of light, it is converted to the distance between the receiver and the respective satellite. The computed distance between a specific satellite and a receiver is called pseudo-range, because the general GPS time is not accurately known in the receiver. Usually, the receiver calculates the accurate time of arrival of a ranging code based on some initial estimate, and the more accurate the initial time estimate is, the more efficient are position and accurate time calculations. A reference GPS time can, but does not have to be provided to the receiver by a communications network.

The computed distances and the positions of the satellites, which are estimated based on the ephemeris parameters, then permit a calculation of the current position of the GPS receiver, since the receiver is located at an intersection of the pseudo-ranges from a set of satellites. If navigation data are available on one of the receiver channels, the comprised indication of the time of transmission can also be used in a time initialization for correcting a clock error in the receiver, as the internal receiver clock is generally biased. In order to be able to compute a position of a receiver in three dimensions and the time offset in the receiver clock, the signals from at least four different GPS satellites are required.

Currently, most GPS receivers are designed for outdoor operations with good signal levels from satellites.

In case of bad reception conditions, for example indoors, the tracking of signals is less reliable with such receivers. One of the problems is a the cross-correlation effect between the satellites. When searching for a specific satellite signal, often an undesired cross-correlated signal from another satellite will be found, such that a synchronization of a wrong satellite signal with a given replica code is obtained. The signal-to-noise ratios of signals from different satellites vary within a wide range indoors, as the satellite signals undergo different attenuation. This implies that the signal from one satellite may be quite strong, while the signal from another satellite is rather weak. At the same time, the pseudo-noise properties of the satellite signals provide only a limited selectivity during the correlation process. Signals from wrong satellites and code-phases are only attenuated by around 20 dB in the correlation procedure. Thus, if the differences in the signal-to-noise ratio of the different satellite signals are higher than this attenuation, then the signals from wrong satellites could interfere with a given channel. That is, a wrong satellite signal with a high signal level can be determined in the correlation procedure to be the desired satellite signal, in case the correct satellite signal has a low signal level. This makes normal tracking impossible.

In a known approach aimed at avoiding a false synchronization, only those satellites are considered which have a limited difference in their signal-to-noise ratios. This approach has the disadvantage, however, that the receiver will often not be able to calculate the position when only signals from a few satellites are received, which is the most probable scenario indoors.

In another known approach, the false synchronization is detected after the tracking phase by analyzing the results of the tracking, for instance when calculating the position of the receiver.

SUMMARY OF THE INVENTION

It is now invented a method, a device, a system, a computer program and a module to prevent an incorrect synchronization between a code-modulated signal received by a receiver and an available replica code due to a cross-correlation. According to the invention an early detection of a cross-correlation is allowed.

A method of preventing an incorrect synchronization between a code-modulated signal received by a receiver and an available replica code is proposed, which comprises performing partial correlations between a respective subset of samples of the replica code and samples of the received code-modulated signal associated to the respective subset of samples of the replica code at a specific alignment between the received code-modulated signal and the replica code. The proposed method further comprises comparing results of at least two of the partial correlations with each other.

Further, an electronic device is proposed, which comprises a partial correlation component adapted to perform partial correlations between a respective subset of samples of an available replica code and samples of a received code-modulated signal associated to the respective subset of samples of the replica code at a specific alignment between the received code-modulated signal and the replica code. The proposed electronic device moreover comprises an evaluation component adapted to compare results of partial correlations provided by the partial correlation component with each other.

Equally, a module for use in an electronic device adapted to receive code modulated signals is proposed, which comprises such a partial correlation component and such an evaluation component.

In addition, a system comprising a mobile terminal and a network element of a mobile communication network adapted to interact with each other is proposed. The mobile terminal includes a receiver which is adapted to receive code-modulated signals from beacons of a positioning system. Moreover, the mobile terminal and/or the network element includes a partial correlation component adapted to perform partial correlations between a respective subset of samples of an available replica code and samples of a code-modulated signal received by the receiver of the mobile terminal, the samples of the received code-modulated signals being associated to the respective subset of samples of the replica code at a specific alignment between the received code-modulated signal and the replica code. Moreover, the mobile terminal and/or the network element includes an evaluation component adapted to compare results of partial correlations provided by the partial correlation component with each other.

Finally, a software program product is proposed, in which a software code for preventing an incorrect synchronization between a code-modulated signal received by a receiver and an available replica code is stored. When running in a processing unit, the software code realizes the steps of the proposed method.

It is to be understood that a subset of samples of the replica code may comprise as well consecutive samples as non-consecutive samples of the replica code. It is further to be noted that the available replica code can be stored or generated in the device carrying out the processing according to the invention, or be provided to this device by some other unit. The processing according to the invention can be realized in the device receiving the code-modulated signal, that is, in the receiver or in a device comprising the receiver. Alternatively, the steps can be realizes entirely or partly in some unit with which the device receiving the code-modulated signal is able to communicate.

The invention proceeds from the consideration that in case a correct code-modulated signal is correlated with a particular replica code, the results of partial correlations between the code-modulated signal and the replica code will all be the same except for a corruption by noise. In case a wrong code-modulated signal is correlated with a particular replica code, in contrast, the results of partial correlations between the code-modulated signal and the replica code will be different from each other. It is therefore proposed that such partial correlations are performed and that the partial correlation results are evaluated by comparing them among each other, for example for determining whether it is improbable that a received signal is modulated with a code corresponding to a particular available replica code. Currently, the use of partial correlations is only known for broadening the bandwidth of the output of a correlator.

It is an advantage of the invention that it allows to detect possible cross-correlations in an early phase, namely already in the tracking phase. Compared to no exclusion of cross-correlated signals, the invention increases the reliability of any subsequent processing which relies on a correct synchronization, for instance of a processing for a positioning. Compared to a later exclusion of cross-correlated signals, the invention allows to avoid unnecessary processing time. Compared to a consideration of only those received signals which have a limited difference in their signal-to-noise ratios, the invention allows to use more received signals, as it enables the synchronization to received signals having a broad spread in their signal-to-noise ratios. This may also decrease the time to first fix (TTFF) in a positioning procedure. The implementation of the invention does not require any changes in the structure of conventional receivers. Moreover, it can be used as an alternative or in addition to known cross-correlation detection methods.

In one embodiment of the invention, it is decided based on the comparison of partial correlation results whether the replica code corresponds to a code employed for code-modulating the received code-modulated signal. The decision may be performed by an evaluation component of the proposed device, of the proposed module or of the network element of the proposed system, for instance by the same evaluation component performing the comparison of the partial correlation results.

In one embodiment of the invention the partial correlations are calculated for a fraction of the epoch of the code, that is, for a fraction of the repetition rate of the code. This ensures that a differentiation between the partial correlations is possible.

In another embodiment of the invention, the comparison comprises a statistical comparison as known from the state of the art. Since the partial correlation values are corrupted by noise, they are not exactly the same, which makes a direct comparison difficult. A statistical comparison allows to compare the correlation results in spite of the noise.

For example, for a statistical comparison a time-to-frequency transform can be applied to the partial correlation results, in particular a fast Fourier transform (FFT) like the discrete Fourier transform (DFT). The output of the transform can then be evaluated in a spectrum analysis. In this spectrum analysis, a peak indicates the required similar behavior of the partial correlations, while a flat spectrum indicates a missing similar behavior.

In a further embodiment, the partial correlation results are moreover integrated coherently and/or non-coherently over several epochs in order to enhance the signal quality. The coherently and/or non-coherently integrated partial correlation results can then be compared to each other.

The invention can be implemented in hardware and/or in software.

Moreover, the invention can be employed for any ranging receiver receiving a code-modulated signal from some beacon which has to be synchronized with an available replica code. The ranging receiver can be for example, though not exclusively, a receiver for a satellite based positioning system like GPS or Galileo. Accordingly, the proposed electronic device can be for instance such a ranging receiver or another device, like a mobile terminal, comprising such a ranging receiver. The proposed system may comprise in addition to the mobile terminal and the network element of the mobile communication network a beacon of a positioning system, for instance a satellite.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
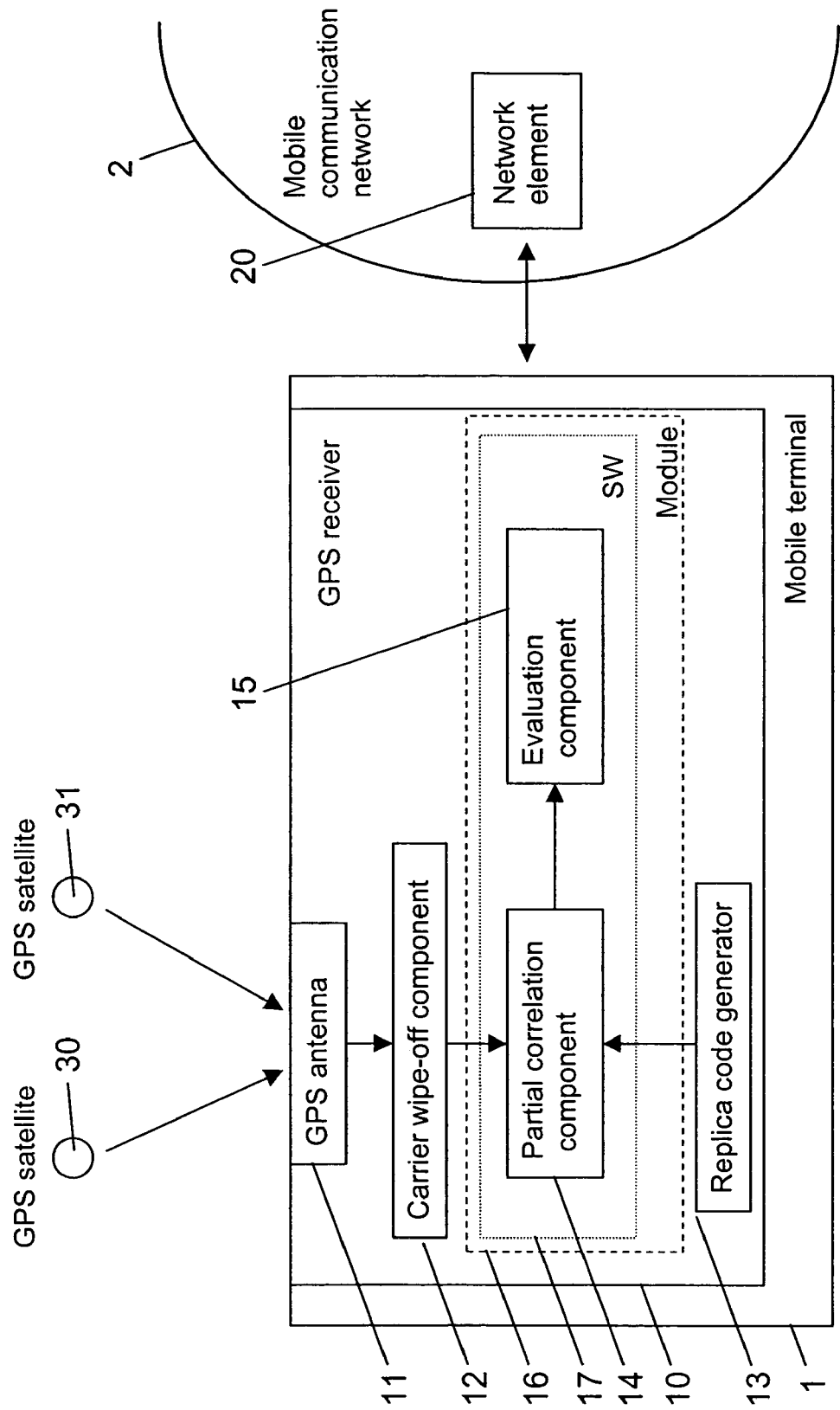
FIG. 1 is a schematic diagram of a system according to the invention.

FIG. 1 schematically presents an exemplary embodiment of a system according to the invention.

The system comprises a mobile terminal 1, a base station 20 of a mobile communication network 2 and a plurality of GPS satellites 30, 31.

The mobile terminal 1 includes a GPS receiver 10, and in addition regular components of a conventional mobile terminal (not shown).

The GPS receiver 10 comprises a GPS antenna 11, a carrier wipe-off component 12, a replica code generator 13, a partial-correlation component 14, and an evaluation component 15. The partial-correlation component 14 and/or the evaluation component 15 may be part of a removable module 16. Further, they may be realized by the code of a software program SW 17 run by a processing unit of the mobile terminal 1. In addition, the GPS receiver 10 includes other components of a conventional GPS receiver (not shown).

The mobile terminal 1 is able to interact with the mobile communication network 2 via the base station 20 as known from the state of the art.

Each GPS satellite 30, 31 transmits a carrier-signal modulated with a pseudo-random code assigned specifically to the respective satellite and with data bits as known from the state of the art.

The GPS receiver 10 of the mobile terminal 1 is able to receive signals from GPS satellites 30, 31 via the GPS antenna 11, to wipe-off the carrier frequency of the signals in the carrier wipe-off component 12, to generate replica codes in the replica code generator 13, and to determine the current position of the mobile terminal 1 based on detected GPS channels as known from the state of the art. The GPS receiver 10 may also make use of the communication capabilities of the mobile terminal 1 for receiving assistance data from the mobile communication network 2 or for leaving required calculations to the mobile communication network 2.

The detection of a GPS channel in general is based on synchronizing a received code-modulated signal after the carrier wipe-off with a corresponding replica code generated locally by the replica code generator 13, that is, on a correct alignment of the received code-modulated signal with the correct replica code. It is to be noted that alternatively, the replica codes could also be stored in the device, in which case a generation of the respectively required replica code is not necessary. Only in case of a successful synchronization, measurements can be performed on the signal and information can be extracted from the signal, for instance for determining the location of the GPS receiver 10.

In the GPS receiver 10 of FIG. 1, the synchronization is achieved by means of a correlation which is modified according to the invention, as will be explained in the following.

A signal output by the carrier wipe-off component 12 of a GPS receiver 10 is the pseudo-random code assigned to a particular satellite 30, 31, which is modulated by data bits and distorted by a noise, as indicated in the equation:

$$s(i)=Ad(i)c(i)+n_0(i),$$

where s(i) is the value of a sample i of the received signal after the carrier wipe-off, where d(i) represents the navigation data modulation, where c(i) is the modulation by the pseudo-random code, where n(i) is the noise component and where A is the signal amplitude. The modulation by the navigation data has a rate of 50 Hz and is thus very small compared with the code modulation having a rate of 1.023 MHz. The data modulation is therefore irrelevant for the approach according to the invention and neglected in the following description.

For a conventional synchronization, the replica code is aligned with a respective phase with the received signal, and samples of the received signal and samples of the replica code at corresponding positions are multiplied in accordance with the following equation:

$$s_1(i)=s(i)r(i+\phi)=Ac(i)r(i+\phi)+n_0(i)r(i+\phi)=Ac(i)r(i+\phi)+n(i),$$

where $s_1(i)$ is the multiplication result for a respective sample i and where $r(i+\phi)$ is the replica code with a particular phase $\phi$. The GPS receiver adjusts the phase until the replica code is aligned correctly with the received signal. In case of a correct alignment, the code modulation is wiped-off. Assuming that $\phi_0$ is the correct phase, the result of the code modulation wipe-off process is given by:

$$s_1(i)=s(i)r(i+\phi_0)=A+n(i)$$

The GPS receiver then integrates the multiplication results to enhance them over the noise, that is, to increase the signal-to-noise ratio for successful further operations, like channel detection, channel tracking, measurements extraction, etc. The result of the integration constitutes the correlation result. A synchronization may be assumed to be given and a GPS channel to be detected in case a combination of a specific received signal, a specific generated replica code and a specific phase leads to a maximal integration result.

As mentioned before, a cross-correlation between a strong received signal and a replica code associated to another satellite than the satellite transmitting the strong received signal may cause a false synchronization. In order to avoid such a false synchronization, according to the invention partial correlations are performed on a received signal, and the results of these partial correlations are compared to each other.

If a received signal is correlated with the correct replica code and the correct phase, all partial correlations will have the same result corrupted by noise:

$$s_2(j) = \sum_{i=jM}^{jM+M} s_1(i)$$

$$= \sum_{i=jM}^{jM+M} s(i)r(i+\varphi_0)$$

$$= \sum_{i=jM}^{jM+M} (A + n(i))$$

$$= MA + n'(j)$$

In the above equation, $s_2(j)$ is the result of a partial correlation at a discrete time instant j, M is the number of subsequent samples considered in one partial correlation, and $n'(j)$ is the summed noise of these M samples. It can be seen that the results of all partial correlations at discrete time instants j are the same.

If a received signal is correlated with the wrong replica code, in contrast, the partial correlations will not all have the same signal corrupted by noise:

$$s_2(j) = \sum_{i=jM}^{jM+M} s_1(i)$$

$$= \sum_{i=jM}^{jM+M} s(i)r(i+\varphi_0)$$

$$= \sum_{i=jM}^{jM+M} (Ac(i)r(i+\varphi_0) + n(i))$$

$$= \sum_{i=jM}^{jM+M} (Ac(i)r(i+\varphi_0)) + n'(j)$$

In the above equation, it can be seen that for different discrete time instants j, the partial correlation results $s_2(j)$ will usually be different from each other if the respective code fraction of the received signal and the part of the replica code aligned to this fraction are different.

The channel detection in the GPS receiver 10 of FIG. 1 will now be explained in more detail with reference to the flow chart of FIG. 2.

Figure 2:
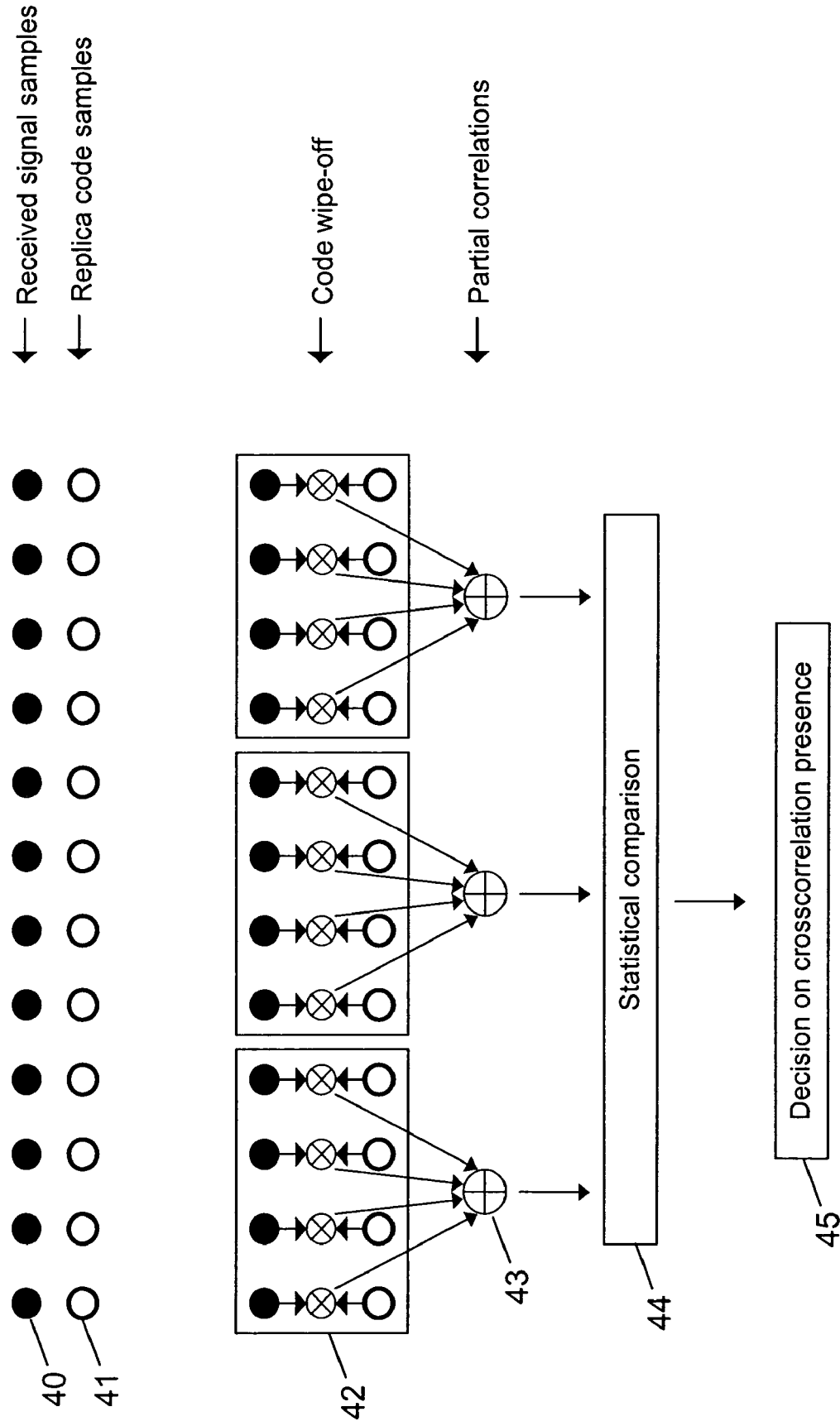
FIG. 2 is a flow chart illustrating a method according to the invention implemented in the system of FIG. 1.

FIG. 2 shows in a first row 40 the received signal samples output by the carrier wipe-off component 12 as black circles, and in a second row 41 aligned to these with a certain phase samples of the replica code provided by the replica code generator 13 as white circles. The samples of the received signal are multiplied by the partial correlation component 14 with the aligned samples of the replica code for the code wipe-off, as indicated by the multiplication elements in a third row 42. The black circles represent again the samples of the received signal and the white circles represent again the samples of the replica code.

The multiplication results are then subdivided by the partial correlation component 14 for the partial correlations into subsets, as indicated by the boxes in the third row 42. The GPS code modulation has a periodicity of 1 ms. This means that partial correlations should be taken as a fraction of 1 ms, since otherwise the receiver will not be able to differentiate between partial correlations. Thus, the formed subsets should comprise multiplication results which are based on samples of the received signal in a respective fraction of 1 ms.

While the correlators of conventional GPS receivers integrate the multiplication results over multiple epochs of the received signal, the partial correlation component 14 of the GPS receiver 10 of FIG. 1 integrates only the multiplication results of a respective subset for obtaining a respective correlation result, that is with a length which is a fraction of the epoch. The integration in subsets is indicated in row 43 of FIG. 2 by summing elements. The proposed partial integrations may also be considered as an oversampling, as a plurality of partial correlation results are provided at the output of the partial correlation component 14 instead of a single correlation result.

In the absence of noise, the evaluation component 15 of the receiver could now easily detect a cross-correlation, as the results of the partial correlations will be equal in case of a correct synchronization and not equal in case of a cross-correlation.

As noise is present, however, the evaluation component 15 of the GPS receiver 10 compares the partial correlation results in a statistical sense using state-of-the-art methods, as indicated in row 44 of FIG. 2.

Based on the statistical comparison, finally, a decision is made by the evaluation component 15 on whether the code of the received signal corresponds to the generated replica code at the current phase. This step is indicated in FIG. 2 in row 45.

Figure 3:
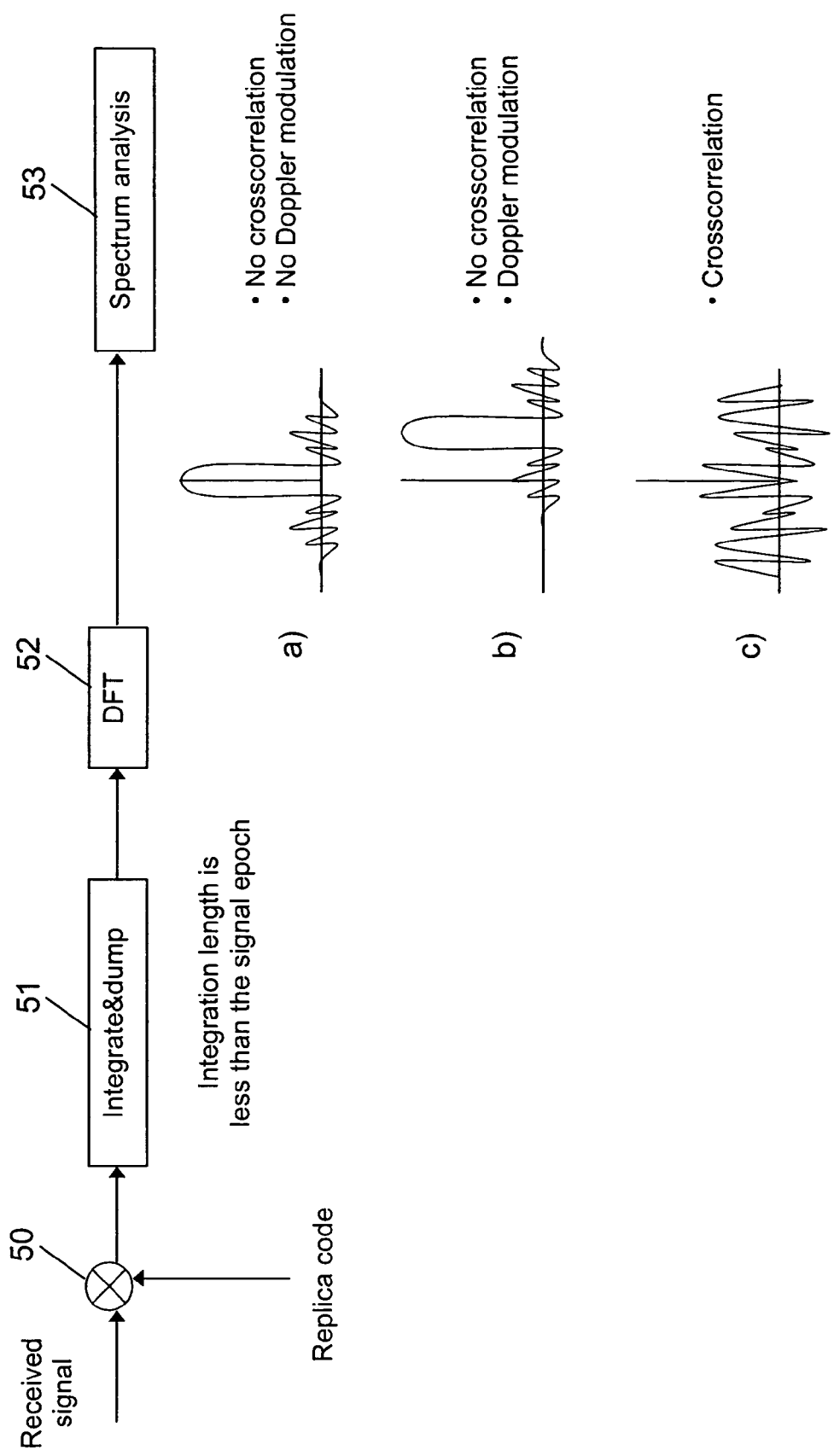
FIG. 3 is a block diagram illustrating an exemplary statistical comparison for use in the method of FIG. 2.

An example for a statistical comparison which may be carried out by the evaluation component 15 is illustrated in FIG. 3. In the block diagram of FIG. 3, the statistical comparison is based on a DFT, which is applied to the oversampled signal output by the partial correlation component 14.

A multiplying element 50 indicates in FIG. 3 again that the received signal and replica code are first multiplied to each other on a sample-by-sample basis. This corresponds to row 42 of FIG. 2.

Then, the multiplication results are integrated with a respective integration length which is shorter than the signal epoch. For each integration, all other multiplication results are dumped. This step is represented in FIG. 3 by block 51, which corresponds to row 43 of FIG. 2.

On the integration results, a DFT is applied. This step is represented in FIG. 3 by block 52.

Possible signals resulting in the DFT are illustrated in three schematic diagrams a), b) and c).

If the synchronization is correct, that is if the code of the received signal corresponds to the generated replica code and if the correct phase shift has been selected, then the output of the DFT will result in a DC peak, as illustrated in diagram a). The peak may be shifted due to remaining Doppler modulations, as illustrated in diagram b). If the synchronization is not correct, in contrast, the signal resulting in the DFT is noisy and the DFT output has a flat spectrum, as illustrated in diagram c).

A spectrum analysis following the DFT, which is represented in FIG. 3 by block 53, thus allows a differentiation between a correct synchronization and a cross-correlation.

Blocks 52 and 53 of FIG. 3 are therefore suited for realizing the statistical comparison 44 of FIG. 2.

Figure 4:
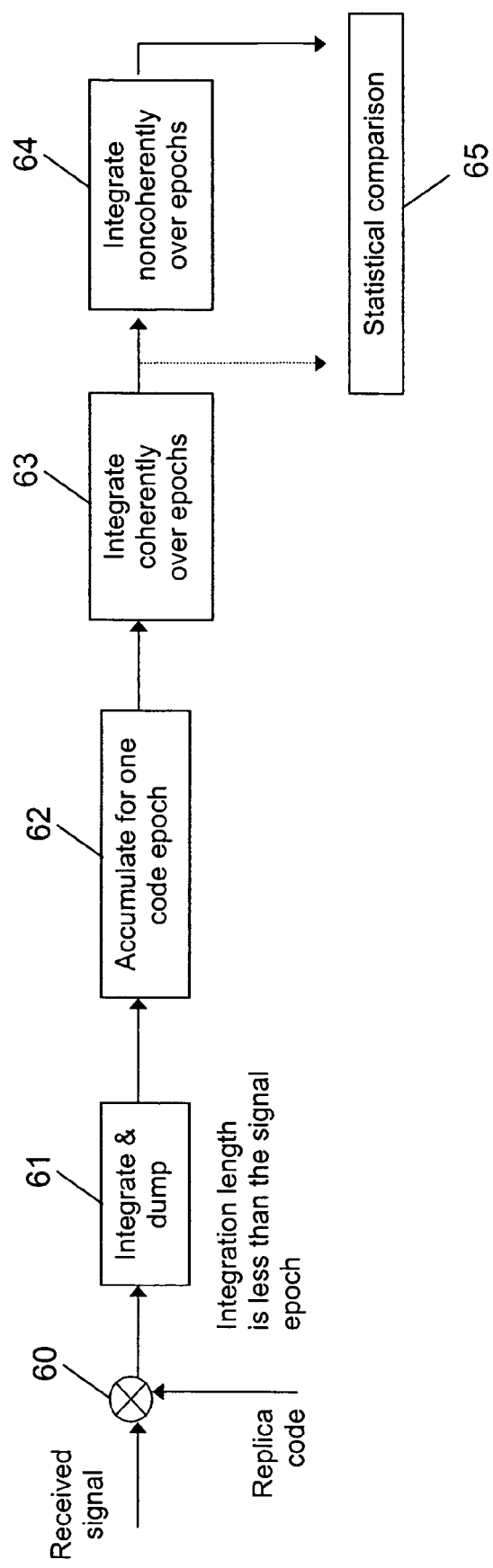
FIG. 4 is a block diagram illustrating an expansion of the method of FIG. 2.

Before the statistical comparison, the signal may be enhanced by a coherent integration and possibly in addition a non-coherent integration in the partial correlation component 14 or the evaluation component 15, as illustrated in FIG. 4.

A multiplying element 60 indicates in FIG. 4 again that the received signal and replica code are first multiplied to each other on a sample-by-sample basis. Equally, the multiplication results are integrated again with a respective integration length which is shorter than the signal epoch, resulting in a respective partial correlation. For each integration, all other multiplication results are dumped. This step is represented in FIG. 4 by block 61.

The partial correlation results are accumulated for a respective code epoch, that is for 1 ms. For example, in case four partial correlations over 250 ms are determined for each epoch, four partial correlation results P11, P12, P13 and P14 will be collected for the first epoch. Then, four partial correlation results P21, P22, P23 and P24 will be collected for the second epoch, etc. This step is represented in FIG. 4 by block 62.

In a subsequent coherent integration, the accumulated values are integrated over various epochs separately for each of the partial correlation integration intervals within the epochs. In the above example, first, the partial correlation results collected for the first two epochs are added to each other, resulting in four coherently integrated partial integration results:

P1 integration=P11+P21
P2 integration=P12+P22
P3 integration=P13+P23
P4 integration=P14+P24

For each further epoch considered in the coherent integration, the partial correlation results collected in block 62 are added to the value of the associated coherently integrated partial integration results P1 integration, P2 integration, P3 integration and P4 integration. This step is represented in FIG. 4 by block 63.

The coherent integration should be continued over as many epochs as possible, since each doubling of the coherent integration time results in an increase of 3 dB of the signal-to-noise ratio (SNR). There are, however, limits to the length of a coherent integration. If the remaining Doppler in a signal is high, then the signal starts to be subtracted from the integration result obtained so far, once the phase of the signal has turned too much. With an integration over 1 ms, a remaining Doppler of about ±500 Hz can be tolerated. A further limitation of the coherent integration length is due to the data modulation in the signal. In GPS, one data bit has a length of 20 ms, and the data bits are binary-phase-shift-keying (BPSK) modulated, which means that signal phase changes by 180 degrees in case of a bit change. If the coherent integration is continued over a bit change, the further integration will thus equally result in a subtraction of the signal from the integration result obtained so far. Practical coherent integration times in GPS are therefore from 1 to 20 epochs.

If the signal levels resulting in the coherent integration are high enough, the results of the coherent integration are now subjected to the statistical comparison represented in FIG. 4 by block 65, as indicated by an arrow with a dotted line. In the statistical comparison, the coherently integrated partial correlation results are compared to each other in order to determine whether the code of the received signal corresponds to the generated replica code at the current phase.

If the signal level resulting in the coherent integration is too low, the SNR is enhanced instead with a non-coherent integration by summing the absolute or the squared values of the partial correlation results over the epochs separately for each partial correlation integration interval. Thereby, residual sinusoidal modulations, for instance due to a Doppler shift, are reduced. This step is represented in FIG. 4 by block 64.

In a non-coherent integration, the signal phase information is lost, and therefore a non-coherent integration can be continued over bit edges. Moreover, in a non-coherent integration the Doppler range stays the same independently of the length of integration. As in the case of a coherent integration, each doubling of the integration time of a non-coherent integration results in a 3 dB higher SNR. It is a disadvantage of a non-coherent integration, however, that in case of weak signals, the noise power increases when taking the absolute value of the partial correlation results or when squaring the partial correlation results, so that there is a loss of in the SNR. For example, while the SNR is over +10 dB after one epoch non-coherent integration of signals having nominal signal levels, the SNR is below −10 dB after an integration over one epoch of a weak GPS signal. Practical non-coherent integration times in GPS are between one epoch and hundreds of epochs.

The results of the non-coherent integration are then subjected to the statistical comparison represented in FIG. 4 by block 65. The statistical comparison compares in this case the non-coherently integrated partial correlation results to each other in order to determine whether the code of the received signal corresponds to the generated replica code at the current phase.

It becomes apparent from the above description of an embodiment of the invention that the invention allows detection of a cross-correlation between a received code modulated signal and an available replica code already in the tracking phase.

While there have been shown and described and pointed out fundamental novel features of the invention as applied to an embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for use by an electronic device, comprising:
performing a first partial correlation between a subset of samples over a first fraction of an epoch of a received code-modulated signal and a respective subset of samples over a corresponding first fraction of an epoch of a replica code;
performing at least a second partial correlation between a different subset of samples over at least a second fraction of said epoch of the received code-modulated signal and a respective different subset of samples over at least a corresponding second fraction of said epoch of the replica code;
comparing results of said first partial correlation and at least said second partial correlation; and
determining if the code-modulated signal and the replica code are cross-correlated based on the comparison of the results between said partial correlations,
wherein a cross-correlation between the code-modulated signal and the replica code is determined if said results indicate that said received code-modulated signal is not associated with said replica code at a specific alignment,
wherein for said comparison, a time-to-frequency transform is applied to results of said partial correlations, and wherein a subsequent spectrum analysis of the result of said time-to-frequency transform is performed.

2. The method according to claim 1, wherein said determining cross-correlation is performed in a tracking phase in which the received code-modulated signal is tracked.

3. The method according to claim 1, further comprising deciding based on said comparison whether said replica code corresponds to a code employed for code-modulating said received code-modulated signal.

4. The method according to claim 1, wherein said subset of samples over said first fraction of said epoch of said received code-modulated signal does not include any samples of said different subset of samples over said at least second fraction of said epoch of the received code-modulated signal.

5. A method for use by an electronic device, comprising:
performing a first partial correlation between a subset of samples over a first fraction of an epoch of a received code-modulated signal and a respective subset of samples over a corresponding first fraction of an epoch of a replica code;
performing at least a second partial correlation between a different subset of samples over at least a second fraction of said epoch of the received code-modulated signal and a respective different subset of samples over at least a corresponding second fraction of said epoch of the replica code;
comparing results of said first partial correlation and at least said second partial correlation; and
determining if the code-modulated signal and the replica code are cross-correlated based on the comparison of the results between said partial correlations,
wherein a cross-correlation between the code-modulated signal and the replica code is determined if said results indicate that said received code-modulated signal is not associated with said replica code at a specific alignment,
wherein results of said partial correlations are subjected to at least one of a coherent integration and a non-coherent integration over a plurality of epochs of said code, and wherein comparing results of said partial correlations comprises comparing results of an integration of said results of said partial correlations over a plurality of epochs.

6. An apparatus, comprising:
a processor; and
memory including code, the memory and the code configured to, with the processor, cause the apparatus to:
perform a first partial correlation between a subset of samples over a first fraction of an epoch of a received code-modulated signal and a respective subset of samples over a corresponding first fraction of an epoch of a replica code and to perform at least a second partial correlation between a different subset of samples over at least a second fraction of said epoch of the received code-modulated signal and a respective different subset of samples over at least a corresponding second fraction of said epoch of the replica code; and
to compare results of said first partial correlation and at least said second partial correlation provided by said partial correlation component, and determine if the code-modulated signal and the replica code are cross-correlated based on the comparison of results between said partial correlations;
wherein a cross-correlation between the code-modulated signal and the replica code is determined if said results indicate that said received code-modulated signal is not associated with said replica code at a specific alignment,
wherein said evaluation component is configured to compare results of said partial correlations provided by said partial correlation component by applying a time-to-frequency transform to results of said partial correlations and by performing a subsequent spectrum analysis of the result of said time-to-frequency transform.

7. The apparatus of claim 6, wherein said memory including code are further configured, with the processor, to cause the apparatus to decide based on said comparison whether said replica code corresponds to a code employed for code-modulating said received code-modulated signal.

8. The apparatus of claim 6, wherein said subset of samples over said first fraction of said epoch of said received code-modulated signal does not include any samples of said different subset of samples over said at least second fraction of said epoch of the received code-modulated signal.

9. The apparatus of claim 6, wherein said apparatus is a mobile terminal.

10. The apparatus according to claim 6, wherein said determining cross-correlation is performed in a tracking phase in which the received code-modulated signal is tracked.

11. An apparatus, comprising:
a processor; and
memory including code, the memory and the code configured to, with the processor, cause the apparatus to:
perform a first partial correlation between a subset of samples over a first fraction of an epoch of a received code-modulated signal and a respective subset of samples over a corresponding first fraction of an epoch of a replica code and to perform at least a second partial correlation between a different subset of samples over at least a second fraction of said epoch of the received code-modulated signal and a respective different subset of samples over at least a corresponding second fraction of said epoch of the replica code; and
to compare results of said first partial correlation and at least said second partial correlation provided by said partial correlation component, and determine if the code-modulated signal and the replica code are cross-correlated based on the comparison of results between said partial correlations;
wherein a cross-correlation between the code-modulated signal and the replica code is determined if said results indicate that said received code-modulated signal is not associated with said replica code at a specific alignment,
wherein said evaluation component is configured to compare results of said partial correlations provided by said partial correlation component by subjecting results of said partial correlations to at least one of a coherent integration and a non-coherent integration over a plurality of epochs of said replica code, and by comparing results of an integration of said results of said partial correlations over a plurality of epochs.

12. Apparatus comprising:
a partial correlation component, configured to perform a first partial correlation between a subset of samples over a first fraction of an epoch of a received code-modulated signal and a respective subset of samples over a corresponding first fraction of an epoch of a replica code and to perform at least a second partial correlation between a different subset of samples over at least a second fraction of said epoch of the received code-modulated signal and a respective different subset of samples over at least a corresponding second fraction of said epoch of the replica code; and
an evaluation component, configured to compare results of said partial correlations provided by said partial correlation component, and to determine if the code-modulated signal and the replica code are cross-correlated based on the comparison of the results between said partial correlations;

wherein a cross-correlation between the code-modulated signal and the replica code is determined if said results indicate that said received code-modulated signal is not associated with said replica code at a specific alignment, wherein said evaluation component is configured to compare results of said partial correlations provided by said partial correlation component by applying a time-to-frequency transform to results of said partial correlations and by performing a subsequent spectrum analysis of the result of said time-to-frequency transform.

13. The module of claim 12, wherein said evaluation component is further configured to decide based on said comparison whether said replica code corresponds to a code employed for code-modulating said received code-modulated signal.

14. The module of claim 12, wherein said subset of samples over said first fraction of said epoch of said received code-modulated signal does not include any samples of said different subset of samples over said at least second fraction of said epoch of the received code-modulated signal.

15. The module according to claim 12, wherein said determining cross-correlation is performed in a tracking phase in which the received code-modulated signal is tracked.

16. Apparatus comprising:
a partial correlation component, configured to perform a first partial correlation between a subset of samples over a first fraction of an epoch of a received code-modulated signal and a respective subset of samples over a corresponding first fraction of an epoch of a replica code and to perform at least a second partial correlation between a different subset of samples over at least a second fraction of said epoch of the received code-modulated signal and a respective different subset of samples over at least a corresponding second fraction of said epoch of the replica code; and
an evaluation component, configured to compare results of said partial correlations provided by said partial correlation component, and to determine if the code-modulated signal and the replica code are cross-correlated based on the comparison of the results between said partial correlations;
wherein a cross-correlation between the code-modulated signal and the replica code is determined if said results indicate that said received code-modulated signal is not associated with said replica code at a specific alignment,
wherein said evaluation component is configured to compare results of said partial correlations provided by said partial correlation component by subjecting results of said partial correlations to at least one of a coherent integration and a non-coherent integration over a plurality of epochs of said replica code, and by comparing results of an integration of said results of at least two of said partial correlations over a plurality of epochs to each other.

17. A system, comprising:
a mobile terminal and a network element of a mobile communication network in communication with the mobile terminal;
wherein said mobile terminal comprises a receiver configured to receive code-modulated signals from beacons of a positioning system;
wherein at least one of said mobile terminal and said network element comprises:
a partial correlation component configured to perform a first partial correlation between a subset of samples over a first fraction of an epoch of a received code-modulated signal and a respective subset of samples over a corresponding first fraction of an epoch of a replica code and to perform at least a second partial correlation between a different subset of samples over at least a second fraction of said epoch of the received code-modulated signal and a respective different subset of samples over at least a corresponding second fraction of said epoch of the replica code; and
an evaluation component configured to compare results of said partial correlations provided by said partial correlation component, and determine if the code-modulated signal and the replica code are cross-correlated based on the comparison of the results between said partial correlations;
and wherein a cross-correlation between the code-modulated signal and the replica code is determined if said results indicate that said received code-modulated signal is not associated with said replica code at a specific alignment,
wherein said evaluation component is configured to compare results of said partial correlations provided by said partial correlation component by applying a time-to-frequency transform to results of said partial correlations and by performing a subsequent spectrum analysis of the result of said time-to-frequency transform.

18. The system of claim 17, wherein said evaluation component is further configured to decide based on said comparison whether said replica code corresponds to a code employed for code-modulating said code-modulated signal received by said receiver of said mobile terminal.

19. The system of claim 17, wherein said subset of samples over said first fraction of said epoch of said received code-modulated signal does not include any samples of said different subset of samples over said at least second fraction of said epoch of the received code-modulated signal.

20. The system of claim 17, further comprising a beacon configured to transmit a code-modulated signal which can be received by said mobile terminal.

21. The system according to claim 17, wherein said determining cross-correlation is performed in a tracking phase in which the received code-modulated signal is tracked.

22. A system, comprising:
a mobile terminal and a network element of a mobile communication network in communication with the mobile terminal;
wherein said mobile terminal comprises a receiver configured to receive code-modulated signals from beacons of a positioning system;
wherein at least one of said mobile terminal and said network element comprises:
a partial correlation component configured to perform a first partial correlation between a subset of samples over a first fraction of an epoch of a received code-modulated signal and a respective subset of samples over a corresponding first fraction of an epoch of a replica code and to perform at least a second partial correlation between a different subset of samples over at least a second fraction of said epoch of the received code-modulated signal and a respective different subset of samples over at least a corresponding second fraction of said epoch of the replica code; and
an evaluation component configured to compare results of said partial correlations provided by said partial correlation component, and determine if the code-modulated signal and the replica code are cross-correlated based on the comparison of the results between said partial correlations;

and wherein a cross-correlation between the code-modulated signal and the replica code is determined if said results indicate that said received code-modulated signal is not associated with said replica code at a specific alignment, wherein said evaluation component is configured to compare results of said partial correlations provided by said partial correlation component by subjecting results of said partial correlations to at least one of a coherent integration and a non-coherent integration over a plurality of epochs of said replica code, and by comparing results of an integration of said results of said partial correlations over a plurality of epochs.

23. A software program product comprising a tangible, non-transitory computer readable storage medium storing program codes thereon for use by a mobile terminal, said program codes comprise:

instructions for performing a first partial correlation between a subset of samples over a first fraction of an epoch of a received code-modulated signal and a respective subset of samples over a corresponding first fraction of an epoch of a replica code;

instructions for performing at least a second partial correlation between a different subset of samples over at least a second fraction of said epoch of the received code-modulated signal and a respective different subset of samples over at least a corresponding second fraction of said epoch of the replica code;

instructions for comparing results of said first partial correlation and at least said second partial correlations correlation, and instructions for determining if the code-modulated signal and the replica code are cross-correlated based on the comparison of the results between of said partial correlations, wherein a cross-correlation between the code-modulated signal and the replica code is determined if said results indicate that said received code-modulated signal is not associated with said replica code at a specific alignment, wherein for said comparison, a time-to-frequency transform is applied to results of said partial correlations and a subsequent spectrum analysis of the result of said time-to-frequency transform is performed.

24. The software program product according to claim 23, wherein said program codes further comprise instructions for determining based on said comparison whether said replica code corresponds to a code employed for code-modulating said received code-modulated signal.

25. The software program product according to claim 23, wherein said subset of samples over said first fraction of said epoch of said received code-modulated signal does not include any samples of said different subset of samples over said at least second fraction of said epoch of the received code-modulated signal.

26. The software program product according to claim 23, wherein said determining cross-correction is performed in a tracking phase in which the received code-modulated signal is tracked.

27. A software program product comprising a tangible, non-transitory computer readable storage medium storing program codes thereon for use by a mobile terminal, said program codes comprise:

instructions for performing a first partial correlation between a subset of samples over a first fraction of an epoch of a received code-modulated signal and a respective subset of samples over a corresponding first fraction of an epoch of a replica code;

instructions for performing at least a second partial correlation between a different subset of samples over at least a second fraction of said epoch of the received code-modulated signal and a respective different subset of samples over at least a corresponding second fraction of said epoch of the replica code;

instructions for comparing results of said first partial correlation and at least said second partial correlations correlation, and instructions for determining if the code-modulated signal and the replica code are cross-correlated based on the comparison of the results between of said partial correlations, wherein a cross-correlation between the code-modulated signal and the replica code is determined if said results indicate that said received code-modulated signal is not associated with said replica code at a specific alignment, wherein results of said partial correlations are subjected to at least one of a coherent integration and a non-coherent integration over a plurality of epochs of said replica code, and wherein comparing results of said partial correlations comprises comparing results of an integration of said results of said partial correlations over a plurality of epochs.

* * * * *